Oct. 29, 1957  W. J. BOTT  2,811,167
PILOT OPERATED SHUTOFF VALVE
Filed May 5, 1952  2 Sheets-Sheet 1

INVENTOR.
William J. Bott
BY John N. Wolfram
Agent

Oct. 29, 1957 W. J. BOTT 2,811,167
PILOT OPERATED SHUTOFF VALVE
Filed May 5, 1952 2 Sheets-Sheet 2

INVENTOR.
William J. Bott
BY John N. Wolfram
Agent

United States Patent Office 2,811,167
Patented Oct. 29, 1957

2,811,167

PILOT OPERATED SHUTOFF VALVE

William J. Bott, Sayville, N. Y., assignor to The Parker Appliance Company, Cleveland, Ohio, a corporation of Ohio Application May 5, 1952, Serial No. 286,123

21 Claims. (Cl. 137—414)

This invention relates to pilot operated shutoff valves and is particularly directed to liquid level control valves which utilize a diaphragm type main fluid pressure operated valve controlled by a float operated pilot valve for shutting off incoming flow when the liquid in the tank has reached a predetermined level.

The invention is particularly adapted for installations in aircraft fuel tanks or other places where it is desirable to fill the tank at a relatively high rate of flow and where it is highly essential that the level control valve function properly at the instant that a predetermined level of liquid in the tank is reached. Shut-off at the proper moment is especially important in connection with pressure refueling of aircraft since in many instances the pressure developed by the source of supply is greater than that which can be withstood by the tank and/or its supporting structure. As a result, if filling is not stopped before the tank is completely full the tank may burst and cause considerable damage to the airplane. For this reason, it is desirable to provide a safeguard against failure of the level control valve to operate.

In diaphragm type valves, the diaphragm must be freely flexible and, by its very nature, is a potential point of weakness which is more susceptible to failure than the other portions of the valve.

In the past, the problem of safeguarding against diaphragm failure has been recognized and one of the solutions has been to provide two main valves operating in series, with either both shutting off at the same time or one shutting off if the other did not. In the present invention it has been an object to provide a single main valve with which there is associated two separate diaphragms, either of which will respond to fluid pressure for closing the single main valve when the proper tank level has been reached even though the other diaphragm may have become ruptured.

It is another object of the invention to provide a valve of the type described in which a single valve member is connected to two fluid pressure responsive diaphragms by a single member which causes the diaphragms and the main valve to move as a unit and wherein failure of either diaphragm will not affect proper operation of the valve member by the other diaphragm.

It is another object of the invention to provide a diaphragm type level control valve having a single main valve connected to a pair of spaced diaphragms and with a separate pressure chamber associated with each diaphragm whereby if either diaphragm ruptures, fluid in the pressure chamber for the other diaphragm will cause the main valve to close when the liquid has reached a predetermined level.

It is another object to provide a diaphragm type level control valve having a single main valve controlled by a pair of diaphragms and in which the main valve will remain open during filling even though one of the diaphragms has become ruptured and will be operated by the other diaphragm to closed position when the tank has been filled to the predetermined level.

It is another object to provide a valve of the type described in which a single main valve member is connected to each of two fluid pressure responsive diaphragms, each having a float operated pilot valve associated therewith; and arranged so that upon failure of either pilot valve to close when a predetermined level of liquid within the tank has been reached, the other pilot valve will close in its normal manner to cause fluid pressure on the associated diaphragm to close the main valve member.

It is another object of the invention to provide a liquid level control valve with a safety feature for assuring operation at the predetermined tank level even though certain parts of the valve have failed or have not functioned properly, and wherein the size and weight of the valve is kept to a minimum.

Other objects are apparent from the following description and from the drawings in which, Figure 1 is a cross-sectional view of the main valve as mounted at the bottom of the tank and a view of the pilot valves, partly in section, as mounted at the top of the tank.

Figure 1:
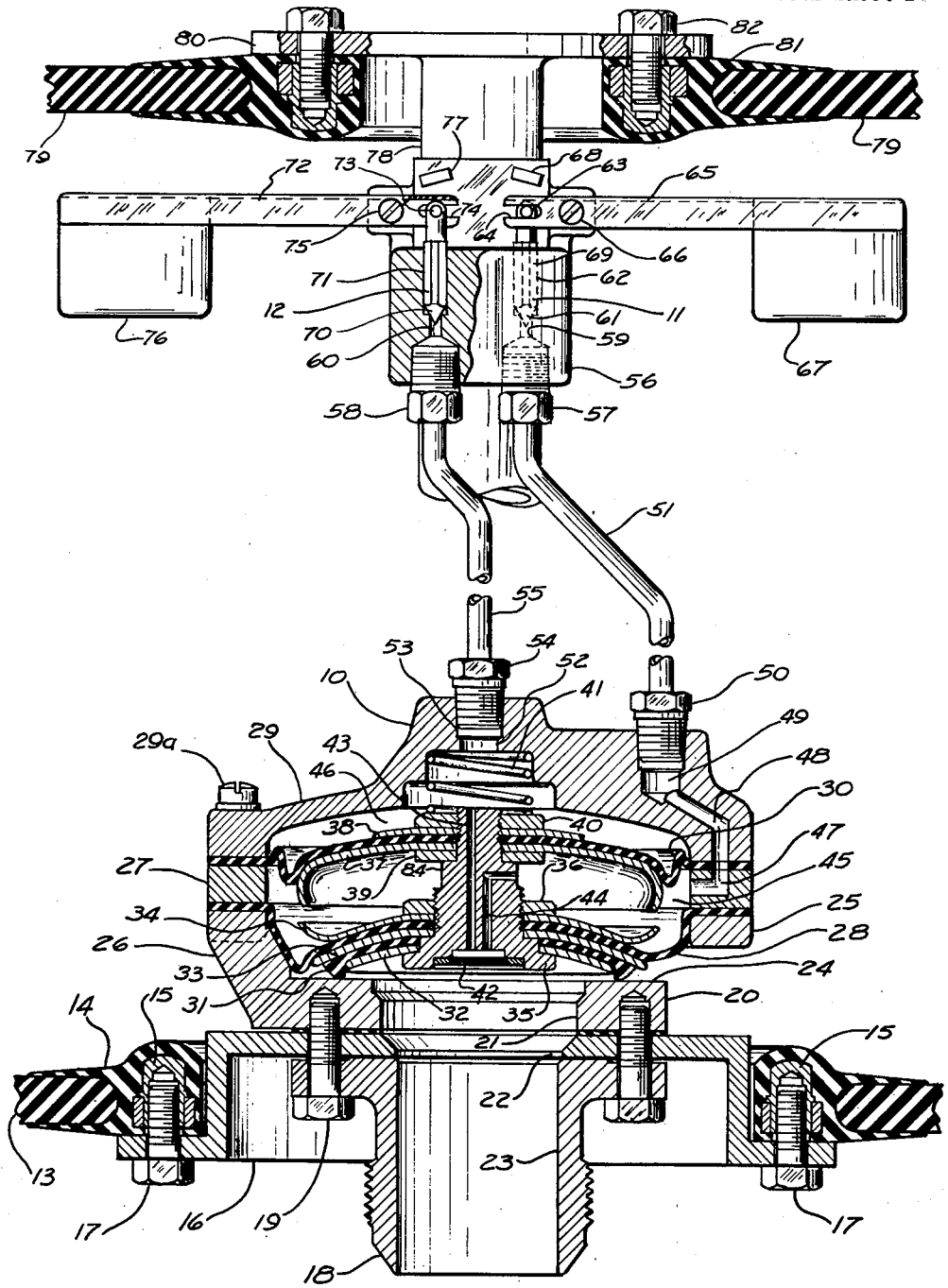

In the drawings, the main valve is generally designated by the numeral 10 and the pilot valves are generally designated by the numerals 11 and 12. The main valve 10 is shown mounted at the bottom of a rubber fuel tank, but if desired it could be inverted and mounted at the top wall of the tank. As shown in Figure 1, the bottom wall 13 of the rubber tank is vulcanized to a rubber adaptor 14 having metallic threaded inserts 15. A closure plate 16 is attached to the rubber adaptor 14 by means of bolts 17 threaded into the inserts 15.

A connector fitting 18 is attached to the cover plate 16 by means of bolts 19 and is adapted to be connected to a fuel supply line, not shown in the drawings. The bolts 19 also connect the main valve 10 to the closure plate 16.

The main valve 10 includes a main seat member 20 having an inlet opening 21 for registry with the openings 22 and 23 in the closure plate 16 and fitting connector 18, respectively. The seat member 20 has a flat valve seat 24 surrounding the inlet opening 21 and is connected to a clamping ring 25 by means of several ribs 26, the spaces between the ribs serving as openings leading to the interior of the tank.

A spacer ring 27 is mounted above the clamping ring 25 and a first diaphragm 28 is clamped at its outer margin therebetween. A cap member 29 is mounted over the spacer ring 27 and a second diaphragm 30 is clamped between these two parts. The clamping ring 25, spacer 27, and cap 29 are secured together by a plurality of screws 29a.

A main valve member 31, preferably of rubber, is attached to the first diaphragm 28 by means of supporting plates 32, 33, 34, and the central bolt 35 and the nut 36. The second diaphragm 30 has attached to it supporting plates 37 and 38, which are held in place by the washer 39 and the nut 40 mounted upon the central bolt 35. The plate 38 is of substantially less diameter than the plate 33 for a reason which will be more fully described.

The bolt 35 has a strainer screen 42 mounted in a recess at its lower end and has two orifice passage-ways 43 and 44 formed therein. The orifice passage-way 44 connects the inlet opening 21 with a first pressure chamber 45 formed between first and second diaphragms 28 and 30, and the second orifice passage-way 43 connects the inlet opening 21 to a second pressure chamber 46 formed between the upper side of the diaphragm 30 and the inner wall of the cap 29.

A duct 47 in the spacer ring 27 connects the first pressure chamber 45 with a duct 48 in the cap 29. The latter duct connects with a port 49 in which is mounted a tube fitting connector 50 attached to a tubing line 51. A duct 52 connects the second pressure chamber 46 with a port 53 in the cap 10. A connector fitting 54 is mounted in the port 53 and is attached to a tubing line 55.

The tubing lines 51 and 55 lead to a pilot valve housing 56 and are attached thereto by means of fitting connectors 57 and 58, and are open to inlet bores 59 and 60 of pilot valves 11 and 12 respectively.

The pilot valve 11 includes a valve member 61 mounted in a bore 62 and adapted to open or close the inlet opening 59. The upper end of the valve member 61 is attached by means of a pin 63 and a slot 64 to a float arm 65 which is pivotally mounted to the pilot valve housing 56 by means of a pin 66. Attached to the outer end of the float arm 65 is a float 67 of cork or other buoyant material. A stop member 68 is formed on the housing 56 and is adapted to engage the inner end of the float arm 65 for controlling the amount which the float 67 may drop by gravity when the tank is not filled with fuel. The pilot valve member 61 has non-circular portions 69 for permitting flow through the bore 62 to the interior of the tank when the pilot valve 11 is open.

Pilot valve 12 is similarly constructed to pilot valve 11. It includes a valve member 70 mounted in a bore 71 and adapted to open and close the inlet opening 60. The upper end is mounted to a float arm 72 by means of a pin 73 and a slot 74. The float arm 72 is pivotally connected to the housing 56 by a pin 75 and carries a float 76 at its outer end. A stop 77 limits the amount to which the float 76 may drop by gravity.

The pilot valve housing 56 is mounted upon a supporting member 78 which extends into the tank and is clamped to the top wall 79 thereof by means of a flange 80 which is bolted to an adaptor 81 by bolts 82, and the adaptor 81 in turn being vulcanized to the top wall 79 of the tank.

In operation, the main valve 10 normally assumes a closed position, as shown in Figure 1, when the fluid supply has not been connected to the inlet fitting 18, or if the source of supply has not been turned on. Meanwhile, if the tank is not full the pilot valves are open, as shown in the schematic representation of Figure 2, due to the action of gravity upon the floats 67 and 76.

Figure 2:
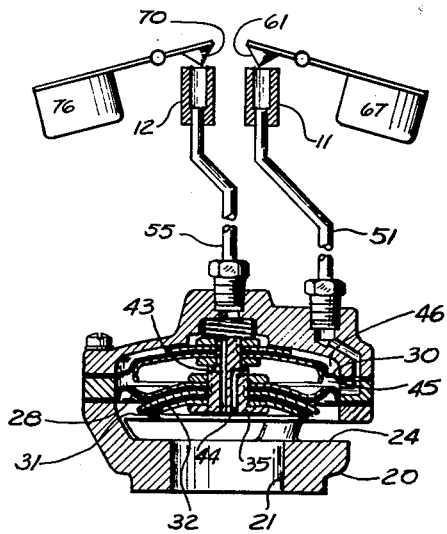
Figure 2 is a cross-section view of the main valve and a schematic view of the pilot valves, with the main valve and both of the pilot valves open as when the tank is being filled.
Figure 3:
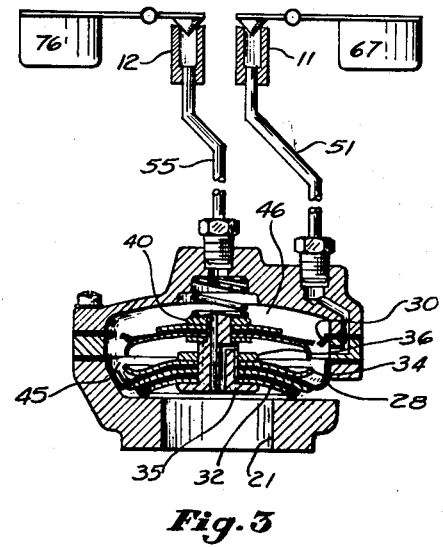
Figure 3 is a view similar to Figure 2 except with the upper diaphragm ruptured and with the main valve and both pilot valves closed.
Figure 4:
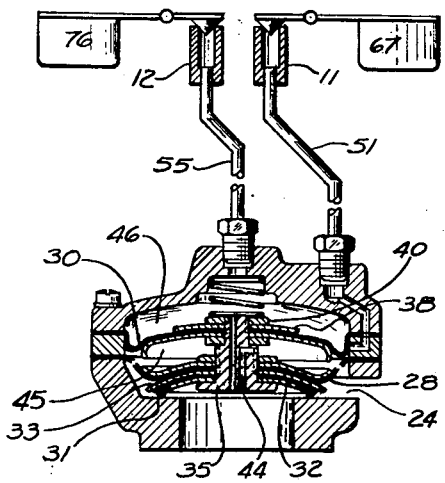
Figure 4 is a view similar to Figure 2 except that it shows the lower diaphragm ruptured and the main valve and both pilot valves closed.

When fluid from a source of supply, not shown, is introduced through the fitting 18, the pressure of the incoming fluid will act on the underside of the main valve 31, lifting it off the seat 24 and permitting flow to pass through the openings between the ribs 26 to the interior of the tank for filling the same. The first diaphragm 28 and the second diaphragm 30, together with the supporting plates and the bolt 35, move upwardly with the main valve 31 as a unit to the position as shown in Figure 2. While the tank is filling, fluid from the inlet port 21 passes through the orifice 44 to the first pressure chamber 45, through the ducts 47, 48, tube 51, and the open pilot valve 11 to the interior of the tank. Meanwhile, fluid from the inlet port 21 also passes through the orifice 43, the duct 52, tube 55, and the open pilot valve 12 to the interior of the tank. Since the ducts and tubing passages leading away from the pressure chambers 45 and 46 are of larger flow capacity than the ducts 44 and 43 leading to the pressure chambers, the fluid is able to discharge from the pressure chambers faster than it may enter and therefore there will be no appreciable build-up of pressure within the chambers during the filling operation.

When the proper liquid level within the tank has been reached the floats 67 and 76 will rise to close the pilot valves 11 and 12, thereby cutting off the discharge of fluid from the pressure chambers 45 and 46. This causes the fluid which is still entering the chambers through the orifices 44 and 43 to build up pressure within these chambers substantially equal to the pressure in the inlet opening 21. The pressure within the second chamber 46 will be substantially the same as the pressure within the chamber 45 and the diaphragm 30 will assume a position substantially as shown in Figure 1. The upward force of the fluid within the first pressure chamber 45 acting upon the lower surfaces of the washer 39, supporting plate 37, and the second diaphragm 30 will be substantially counterbalanced by the pressure of the fluid within the second pressure chamber 46 acting downward upon the second diaphragm 30, the supporting plate 38, and across the outer portion of the nut 40 beyond a diameter equal to the diameter 84 of the central bolt 45. The downward fluid pressure within the second chamber 46 acting upon the upper end of the bolt 35 and the portion of the nut 40 within a diameter equal to the diameter 84 will augment the pressure of fluid in the first pressure chamber 45 acting downward upon the nut 36, plate 34, and the unclamped and unsupported portions of the first diaphragm 28 to more than counterbalance the upward force of the fluid within the inlet opening 21 acting on the lower side of the support plate 32 and central bolt 35 to cause the main valve to move downward to its closed position against the valve seat 24. This position of the parts is illustrated in Figure 1.

If, before or during filling, the upper diaphragm 30 has become ruptured, the main valve will open or remain open during filling as before. When the tank has been filled to the predetermined level, the floats 67 and 76 will again rise to close the pilot valves 11 and 12. Because of the ruptured upper diaphragm 30, the first and second pressure chambers 45 and 46 will be in communication with each other through the ruptured portion. Upon the closing of the pilot valves the pressure of the fluid in both chambers will build up as before. The pressures on opposite sides of the second diaphragm 30 will again be substantially balanced and the pressure acting downwardly upon the upper end of the center bolt 35 and a portion of the nut 40, the nut 36, supporting plate 34, and the unsupported portion of the first diaphragm 28 will overbalance the pressure in the inlet opening 21 acting upwardly on the lower side of the supporting plate 32 and the center bolt 35 to move the main valve to closed position.

In the event the lower diaphragm 28 should become ruptured before or during filling, the main valve will again open or remain open, as the case may be, until the tank has been filled to the predetermined level. When this level has been reached, the pilot valves 11 and 12 will again close to shut off the discharge of fluid through the passages leading from the pressure chambers 45 and 46. Because of the ruptured lower diaphragm 28, the first pressure chamber 45 is now open to the interior of the tank and fluid may escape into the tank faster than it may enter the chamber through the orifice 44, hence there will be no build-up of fluid pressure within the first pressure chamber 45. However, the second diaphragm 30 continues to seal off the second pressure chamber 46 so that pressure of the fluid will build up therein and act downwardly across the entire upper surface of the central bolt 35, nut 40, plate 38, and the exposed portion of the diaphragm 30 to more than counterbalance the upward force of the fluid acting upon the underside of the supporting plate 32 and central bolt 35 and cause the main valve 31 to close against the valve seat 24.

Figure 5:
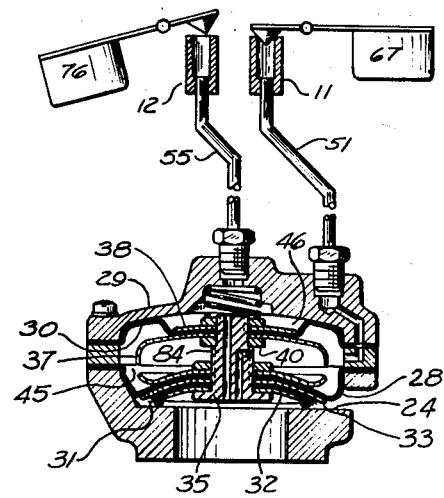
Figure 5 is a view similar to Figure 2 except that it shows the main valve closed even though one of the pilot valves has failed to close when a predetermined liquid level has been reached.

If the float 76 should become logged so that it will not rise to close the pilot valve 12, or if for any other reason the pilot valve should fail to close at the proper time, the float 67 will rise in its normal fashion to close off the pilot valve 11. Failure of the pilot valve 12 to close will permit fluid within the second pressure chamber 46 to continue to be exhausted to the interior of the tank so that there will be no appreciable build-up of pressure within the second chamber 46. However, closure of the pilot valve 11 will cause the pressure of the fluid within the first pressure chamber 45 to build up and force the diaphragms to the positions as shown in Figure 5. In this event, the second diaphragm 30 lies against the inner wall of the cap 29 for a distance almost to the outer diameter of the plate 38. Since the cap 29 is a rigid member and not attached to the movable valve member assembly, the pressure of the diaphragm portion lying thereagainst has no tendency to cause movement of the main valve member assembly. As a result, the force of the fluid within the first chamber 45 tending to move the valve member assembly upwardly is determined by the annular area lying between the diameter 84 of the bolt 35 and a diameter slightly larger than the plate 38. This pressure augments the pressure of fluid in the inlet 21 acting on the underside of the plate 32 in exerting an opening force on the valve. Meanwhile, the pressure of the fluid within the first chamber 45 acts downwardly upon the nut 36, plate 34, and first diaphragm 28. The total area subject to this downward pressure is determined by the diameter 84 of the center bolt 35 and a diameter about halfway between the outer rim of the plate 32 and the clamping ring 25. The latter diameter is considerably greater than the diameter of the plate 38 so that the total effective downward force exerted by the fluid within chamber 45 is greater than the effective upward force exerted by the fluid within the chamber 45 and the inlet 21 and hence the main valve 31 will be moved to closed position.

In the preferred embodiment as illustrated, two float operated pilot valves 11 and 12 are employed. As already explained, either pilot valve can cause closure of the main valve at the proper time even though the other pilot valve has failed to function. If desired, the pilot valve 11 can be omitted without interfering with the protection against diaphragm failure obtained by the use of two diaphragms. In this case the duct 47 is also omitted and passage 44 may or may not be omitted. Closure of the pilot valve 12 will then normally cause a pressure buildup in chamber 46 to close the main valve. If diaphragm 28 should become ruptured, pressure in chamber 46 will still close the main valve as before. If the diaphragm 30 should rupture and diaphragm 28 remain intact, the chambers 45 and 46 become joined and fluid pressure acting on diaphragm 28 then causes the main valve to close.

Although the invention has been illustrated in the drawings with float operated pilot valves, it is obvious that other types of pilot valves may be employed for closing off the ducts leading from the pressure chambers 45 and 46 when the liquid in the tank has reached a predetermined level. For example, the pilot valves may be of pressure sensitive electrically operated or other types. Likewise, many other variations in the detail structure and arrangement of the parts may be made without departing from the invention as defined in the following claims.

I claim:

1. In a valve, a casing having inlet and outlet ports, a valve member for controlling the passage of fluid from the inlet to the outlet, a first diaphragm within the casing connected to the valve and a wall of the casing, a second diaphragm within the casing and connected to the wall of the casing, said second diaphragm being spaced from the first diaphragm and forming therebetween a first pressure chamber and also forming with the wall of the casing a second pressure chamber, a duct leading from the second pressure chamber and adapted to be opened or closed to control discharge of fluid from the pressure chamber, said second diaphragm being movable by the pressure of fluid within the second pressure chamber, a rigid member connecting the first and second diaphragms whereby the first diaphragm will move with the second diaphragm and cause the valve member to close the inlet port, and a passage connecting the inlet to the second pressure chamber.

2. In a valve, a casing having inlet and outlet ports, a valve member for controlling the passage of fluid from the inlet to the outlet, a first diaphragm within the casing and attached to the valve member, a second diaphragm within the casing, first and second pressure chambers respectively associated with the first and second diaphragms, a duct leading from each pressure chamber, each of said ducts adapted to be opened or closed to control discharge of fluid from the respective pressure chamber, each diaphragm being movable by the pressure of fluid within its respective pressure chamber, a rigid member connecting the first diaphragm to the second diaphragm whereby the diaphragms will move together for closing the valve member regardless of which diaphragm is actuated by fluid pressure within its respective pressure chamber, and passages through said rigid member connecting the inlet to each of the pressure chambers.

3. In a valve, a casing having inlet and outlet ports, a valve member for controlling the passage of fluid from the inlet to the outlet, a first movable diaphragm within the casing and attached to the valve member, a second movable diaphragm within the casing, first and second pressure chambers respectively associated with the first and second diaphragms, a duct leading from each pressure chamber, each of said ducts adapted to be opened or closed to control discharge of fluid from the respective pressure chamber, said second diaphragm being movable by the pressure of fluid within the second pressure chamber, a passage connecting the second pressure chamber with the inlet port, an interconnection between the first and second diaphragms, the pressure chambers being separated by the second diaphragm whereby upon rupture of the second diaphragm the chambers will be joined and fluid pressure therein will operate upon the first diaphragm and cause the valve member to close the inlet port.

4. In a valve, a casing having inlet and outlet ports, a valve member for controlling the passage of fluid from the inlet to the outlet, a first diaphragm within the casing and attached to the valve member, a second diaphragm within the casing, a rigid member connecting the diaphragms in spaced relation, the space between the diaphragms constituting a first pressure chamber, a second pressure chamber within the casing, a duct leading from each pressure chamber, each of said ducts adapted to be opened or closed to control discharge of fluid from the respective chamber, passages through said rigid member connecting each of the pressure chambers to the inlet port, said pressure chambers being separated by the second diaphragm whereby upon rupture of the second diaphragm they will be joined and fluid pressure therein will operate upon the first diaphragm and cause the valve member to close the inlet port.

5. In combination, a device for controlling the level to which a tank may be filled comprising a fluid pressure operated main valve and a float operated pilot valve, said main valve including a casing having inlet and outlet ports, a valve member for controlling the passage of fluid from the inlet to the outlet, a first diaphragm within the casing and attached to the valve member and movable therewith, a second diaphragm within the casing, a first pressure chamber between the diaphragms, a second pressure chamber within the casing, a duct leading from the second pressure chamber to the pilot valve and adapted to be closed thereby when the tank has been filled to a predetermined level, a rigid member connecting the diaphragms, passages through said member connecting the pressure chambers with said inlet port, said pressure chambers being separated by said second diaphragm whereby upon rupture of said second diaphragm they will be joined and fluid pressure therein will operate upon said first diaphragm and cause the valve member to close the inlet port.

6. In a valve, a casing having inlet and outlet ports, a valve member for controlling the passage of fluid from the inlet to the outlet port, a first movable diaphragm within the casing, a second movable diaphragm spaced from the first diaphragm to form a pressure chamber therebetween, attaching means connecting both diaphragms to the valve member, a duct leading from the pressure chamber and adapted to be opened or closed to control discharge of fluid therefrom, a passage connecting the inlet to the pressure chamber, said first diaphragm and its attaching means having portions adapted to transmit fluid pressure within the pressure chamber acting thereagainst to the valve member in a valve closing direction, said second diaphragm and its attaching means having portions adapted to transmit fluid pressure within the pressure chamber acting thereagainst to the valve member in a valve opening direction, said last mentioned portions being of smaller total area than the first mentioned portions whereby the valve member will be moved to closed position by the pressure of fluid within the pressure chamber when the duct leading therefrom is closed.

7. In a valve, a casing having inlet and outlet ports, a valve member for controlling the passage of fluid from the inlet to the outlet, first and second movable diaphragms within the casing and spaced to provide a pressure chamber therebetween, means for attaching both diaphragms to the valve member, a duct leading from the pressure chamber and adapted to be opened or closed to control discharge of fluid therefrom, a passage connecting the inlet to the pressure chamber, said first diaphragm being subject to fluid pressure within the pressure chamber and adapted to transmit the same to the valve member in a valve closing direction, said casing having a wall for rigidly supporting a movable portion of the second diaphragm, the unsupported portion of the second diaphragm being subject to fluid pressure within the chamber and adapted to transmit the same to the valve member in a valve opening direction, said unsupported portion of the second diaphragm being smaller than the first diaphragm whereby fluid pressure within the chamber will cause the valve member to close.

8. In a valve, a casing having inlet and outlet ports, a valve member for controlling the passage of fluid from the inlet to the outlet, first and second movable diaphragms within the casing and spaced to provide a pressure chamber therebetween, means for attaching both diaphragms to the valve member, a duct leading from the pressure chamber and adapted to be opened or closed to control discharge of fluid therefrom, a passage connecting the inlet to the pressure chamber, a first plate supporting the underside of the first diaphragm and serving to transmit fluid pressure acting within the pressure chamber upon the portion of the first diaphragm supported thereby to the valve member in a valve closing direction, a second plate supporting the upper side of the second diaphragm and serving to transmit fluid pressure acting within the pressure chamber upon the portion of the second diaphragm supported thereby to the valve member in a valve opening direction, the first plate being of larger diameter than the second plate whereby fluid pressure within the chamber will cause the valve member to close.

9. In a valve, a casing having inlet and outlet ports, a valve member for controlling the passage of fluid from the inlet to the outlet, first and second spaced diaphragms clamped at their outer margins to the casing, means for attaching the central portion of both diaphragms to the valve member, the diaphragms being spaced to provide a pressure chamber therebetween and being clamped to the casing at substantially equal diameters, a duct leading from the pressure chamber and adapted to be opened and closed for controlling the discharge of fluid therefrom, a passage connecting the inlet to the pressure chamber, an unclamped portion of said first diaphragm being subject to fluid pressure within the chamber and serving to transmit the same to the valve member in a valve closing direction, said casing having a wall for rigidly supporting an unclamped portion of the second diaphragm, the unclamped and unsupported portion of the second diaphragm being subject to fluid pressure within the chamber and serving to transmit the same to the valve member in a valve opening direction, said unclamped and unsupported portion of the second diaphragm being smaller than the unclamped portion of the first diaphragm whereby fluid pressure in the chamber will cause the valve member to close.

10. In a valve, a casing having inlet and outlet ports, a valve member for controlling the passage of fluid from the inlet to the outlet, first and second diaphragms clamped at their outer margins to the casing and spaced to form a first pressure chamber therebetween, a second pressure chamber between the second diaphragm and a wall of the casing, ducts leading from each pressure chamber and adapted to be opened or closed to control discharge of fluid from the respective chamber, passages connecting the inlet to the pressure chambers, means for attaching the central portions of both diaphragms to the valve member, said means including upper and lower supporting plates for the second diaphragm and a lower supporting plate for the first diaphragm, each plate serving as a means for transmitting fluid pressure in the pressure chambers acting on the portion of the respective diaphragm supported thereby to the valve member, the lower plates transmitting fluid pressure to the valve member in a closing direction and the upper plate transmitting fluid pressure to the valve member in an opening direction, the lower plates being of substantially equal diameter and the upper plate being of relatively smaller diameter whereby less force will be transmitted to the valve member by the upper plate at a given fluid pressure than by either of the lower plates.

11. In combination, a device for controlling the level to which a tank may be filled comprising a fluid pressure operated main valve and first and second float operated pilot valves, said main valve including a casing having an inlet and outlet port, a valve member for controlling the passage of fluid from the inlet to the outlet port, a first diaphragm attached to the casing above the outlet port and also attached to the valve member, a second diaphragm attached to the valve casing above the first diaphragm, a first pressure chamber between the diaphragms and a second pressure chamber above the second diaphragm, a duct leading from the first pressure chamber to the first pilot valve and another duct leading from the second pressure chamber to the second pilot valve, each of said pilot valves being adapted to close the respective duct when the tank has been filled to a predetermined level to permit fluid pressure to be created within the respective chambers, passages connecting the pressure chambers with the inlet port, each of the diaphragms being movable by the pressure of fluid within its respective pressure chamber, and an interconnection between the first and second diaphragms whereby said first diaphragm will move with the second diaphragm and cause the valve member to close the inlet port when the second pilot valve has closed the duct leading from the second pressure chamber.

12. In combination, a device for controlling the level to which a tank may be filled comprising a fluid pressure operated main valve and first and second float operated pilot valves, said main valve including a casing having an inlet and an outlet port, a valve member for controlling the passage of fluid from the inlet to the outlet port, a first diaphragm attached to the casing above the outlet port and also attached to the valve member, a second diaphragm attached to the valve casing above the first diaphragm, a first pressure chamber between the diaphragms and a second pressure chamber above the second diaphragm, a duct leading from the first pressure chamber to the first pilot valve and another duct leading from the second pressure chamber to the second pilot valve, each of said pilot valves being adapted to close the respective duct when the tank has been filled to a predetermined level to permit fluid pressure to be created within the respective chambers, passages connecting the pressure chambers with the inlet port, each of the diaphragms being movable by the pressure of fluid within its respective pressure chamber, and a rigid connection between the first and second diaphragms whereby said diaphragms will move together and cause the valve member to close the inlet port regardless of which diaphragm has been actuated by fluid pressure created within the respective chamber upon closure of the respective duct by the respective pilot valve.

13. Valve mechanism for controlling the supply of fluid under pressure into a reservoir to a predetermined level therein comprising a housing, a valve seat in said housing in the path of flow of said fluid, a single valve member adapted to be moved toward a closing position against said seat to shut off the flow, a pair of flexible diaphragms each having a greater area than said seat and defining two separate fluid pressure chambers within said housing each in communication with said fluid pressure supply, said housing having a discharge outlet on the same side of said diaphragms as said valve, separate bleed ports connected to said chambers respectively, separate float means controlling said bleed ports, and means operatively connecting both said diaphragms with said single valve member for conjoint action of said valve in response to the closing of either bleed port.

14. Valve mechanism for controlling the supply of fluid under pressure into a reservoir to maintain a predetermined level therein comprising a housing, a valve seat in said housing, a valve member adapted to be moved toward a closed position against said seat, a first flexible diaphragm on which said valve member is mounted, a second flexible diaphragm defining with said first diaphragm, a pair of pressure chambers within said housing of greater area than said valve seat, said housing having a discharge outlet on the same side of said diaphragms as said valve, bleed ports connected to said chambers respectively, means for controlling the escape of fluid from said bleed ports separately to cause development of a pressure within the chamber associated with the closed bleed port to cause closing of said valve, and continuously open passage means for supplying fluid pressure from said fluid pressure supply into both of said chambers to develop the pressure therein for closing said valve.

15. Valve mechanism for controlling the supply of fluid under pressure into a reservoir to a predetermined level therein comprising a housing, a valve seat in said housing in the path of flow of said fluid, a single valve member adapted to be moved toward a closing position against said seat to shut off the flow, a pair of flexible diaphragms each having a greater area than said seat and defining two separate fluid pressure chambers within said housing each in communication with said fluid pressure supply, said housing having a discharge outlet on the same side of said diaphragms as said valve, separate bleed ports connected to said chambers respectively, separate float means controlling said bleed ports, and means operatively connecting both said diaphragms with said single valve member for closing said valve in response to the closing of either bleed port.

16. A valve mechanism for controlling the supply of fluid under pressure into a reservoir to a predetermined level therein comprising a housing, a valve seat in said housing in the path of flow of said fluid, a single valve member adapted to be moved toward a closing position with respect to said seat to shut off the flow, a pair of elements presenting two movable walls in the housing, said walls and housing defining two separate fluid pressure chambers, each of the walls having an area larger than the area of the valve seat and subject to fluid pressure in a respective one of said chambers, each of said chambers being in communication with said fluid pressure supply, said housing having a discharge outlet on the same side of said walls as said valve, separate bleed ports connected to said chambers respectively, separate means controlling said bleed ports, and means operatively connecting each of said walls to said valve member to cause said valve member to move to its closed position when either wall is moved by fluid pressure developed in the respective chamber upon closing of the respective bleed port.

17. A valve mechanism for controlling the supply of fluid under pressure into a reservoir to a predetermined level therein comprising a housing, a valve seat in said housing in the path of flow of said fluid, a single valve member adapted to be moved toward a closing position with respect to said seat to shut off the flow, a pair of elements presenting two movable walls in the housing, said walls and housing defining two separate fluid pressure chambers, each of the walls having an area larger than the area of the valve seat and subject to fluid pressure in a respective one of said chambers, each of said chambers being in communication with said fluid pressure supply, said housing having a discharge outlet on the same side of said walls as said valve, separate bleed ports connected to said chambers respectively, separate means controlling said bleed ports, and rigid means connecting both of said walls and said valve member whereby when either wall is subjected to fluid pressure developed in the respective chamber upon closing of the respective bleed port said walls will move together for carrying said valve member to its closed position.

18. In a valve, a casing having inlet and outlet ports, a valve member for controlling the passage of fluid from the inlet to the outlet, a first movable diaphragm within the casing and attached to the valve member, a second movable diaphragm within the casing, first and second pressure chambers respectively associated with the first and second diaphragms, a duct leading from each pressure chamber, each of said ducts adapted to be opened or closed to control discharge of fluid from the respective pressure chamber, said second diaphragm being movable by the pressure of fluid within the second pressure chamber, a passage connecting the second pressure chamber with the inlet port, means providing operative connection between said diaphragms effective to cause the diaphragms to move in unison at least in the direction of movement effective to close the valve member and whenever the second diaphragm is intact and fluid pressure in the second chamber is dominant over fluid pressure in the first chamber, the pressure chambers being separated by the second diaphragm whereby upon rupture of the second diaphragm the chambers will be joined and fluid pressure therein will operate upon the first diaphragm and cause the valve member to close the inlet port.

19. In a valve, a casing having inlet and outlet ports, a valve member for controlling the passage of fluid from the inlet to the outlet, a first movable diaphragm within the casing and attached to the valve member, a second movable diaphragm within the casing, first and second pressure chambers respectively associated with the first and second diaphragms, a duct leading from each pressure chamber, each of said ducts adapted to be opened or closed to control discharge of fluid from the respective pressure chamber, said second diaphragm being movable by the pressure of fluid within the second pressure chamber, a passage connecting the second pressure chamber with the inlet port a rigid interconnection between the first and second diaphragms, the pressure chambers being separated by the second diaphragm whereby upon rupture of the second diaphragm the chambers will be joined and fluid pressure therein will operate upon the first diaphragm and cause the valve member to close the inlet port.

20. In combination, a device for controlling the level to which a tank may be filled comprising a fluid pressure operated main valve and first and second float operated pilot valves, said main valve including a casing having an inlet and outlet port, a valve member for controlling the passage of fluid from the inlet to the outlet port, a first diaphragm attached to the casing above the outlet port and also attached to the valve member, a second diaphragm attached to the casing above the first diaphragm, a first pressure chamber between the diaphragms and a second pressure chamber above the second diaphragm, a duct leading from the first pressure chamber to the first pilot valve and another duct leading from the second pressure chamber to the second pilot valve, each of said pilot valves being adapted to close the respective duct when the tank has been filled to a predetermined level to permit fluid pressure to be created within the respective chambers, passages connecting the pressure chambers with the inlet port, each of the diaphragms being movable by the pressure of fluid within its respective pressure chamber, and means providing operative connection between the first and second diaphragms effective to cause the diaphragms to move in unison at least in the direction of movement effective to cause the valve member to close the inlet port whereby said first diaphragm will move with the second diaphragm and cause the valve member to close the inlet port when the second pilot valve has closed the duct leading from the second pressure chamber.

21. In combination, a device for controlling the level to which a tank may be filled comprising a fluid pressure operated main valve and first and second float operated pilot valves, said main valve including a casing having an inlet and outlet port, a valve member for controlling the passage of fluid from the inlet to the outlet port, a first diaphragm attached to the casing above the outlet port and also attached to the valve member, a second diaphragm attached to the casing above the first diaphragm, a first pressure chamber between the diaphragms and a second pressure chamber above the second diaphragm, a duct leading from the first pressure chamber to the first pilot valve and another duct leading from the second pressure chamber to the second pilot valve, each of said pilot valves being adapted to close the respective duct when the tank has been filled to a predetermined level to permit fluid pressure to be created within the respective chambers, passages connecting the pressure chambers with the inlet port, each of the diaphragms being movable by the pressure of fluid within its respective pressure chamber, and a rigid interconnection between the first and second diaphragms whereby said first diaphragm will move with the second diaphragm and cause the valve member to close the inlet port when the second pilot valve has closed the duct leading from the second pressure chamber.

References Cited in the file of this patent

UNITED STATES PATENTS

| | | |
|---|---|---|
| 1,269,721 | Kuntny | June 18, 1918 |
| 1,871,044 | Crosthwait et al. | Aug. 9, 1932 |
| 2,388,868 | Ray | Nov. 13, 1945 |
| 2,619,108 | Sweeney | Nov. 25, 1952 |
| 2,683,580 | Griswold | July 13, 1954 |
| 2,698,631 | Bashark | Jan. 4, 1955 |
| 2,712,828 | Badger | July 12, 1955 |